United States Patent [19]

O'Holleran

[11] Patent Number: 5,068,071
[45] Date of Patent: Nov. 26, 1991

[54] HOLLOW SPHERICAL SHELL MANUFACTURE

[75] Inventor: Thomas P. O'Holleran, Belleville, Mich.

[73] Assignee: KMS Fusion, Inc., Ann Arbor, Mich.

[21] Appl. No.: 514,233

[22] Filed: Apr. 25, 1990

[51] Int. Cl.$^5$ .............................................. B29C 67/00
[52] U.S. Cl. ........................................ 264/56; 65/18.1; 65/21.4; 264/63; 264/65; 264/86; 264/114; 264/311; 419/5; 419/65; 419/66
[58] Field of Search ................... 65/18.1, 21.4; 264/86, 264/87, 42, 43, 44, 310, 311, 114, 56, 63, 65; 419/5, 61, 62, 65, 66

[56] References Cited

U.S. PATENT DOCUMENTS

| Re. 15,641 | 7/1923 | Emery | 264/310 X |
| 1,373,121 | 3/1921 | Emery | 264/311 |
| 2,161,281 | 6/1939 | Carter | 264/86 |
| 2,469,892 | 5/1949 | Rempel | 264/86 X |
| 2,569,869 | 10/1951 | Rempel | 264/86 |
| 3,445,551 | 5/1969 | Griffin | 264/310 |
| 4,744,831 | 5/1988 | Beck | 106/288 B |
| 4,777,154 | 10/1988 | Torobin | 501/84 |
| 4,812,298 | 3/1989 | Kohtoku | 423/327 |

FOREIGN PATENT DOCUMENTS 2059860  4/1981  United Kingdom ................ 264/86

Primary Examiner—Mary Lynn Theisen
Attorney, Agent, or Firm—Barnes, Kisselle, Raisch, Choate, Whittemore & Hulbert

[57] ABSTRACT

A process for making a hollow spherical shell of silicate glass composition in which an aqueous suspension of silicate glass particles and an immiscible liquid blowing agent is placed within the hollow spherical cavity of a porous mold. The mold is spun to reduce effective gravity to zero and to center the blowing agent, while being heated so as to vaporize the immiscible liquid and urge the water carrier of the aqueous suspension to migrate into the body of the mold, leaving a green shell compact deposited around the mold cavity. The green shell compact is then removed from the cavity, and is sintered for a time and a temperature sufficient to form a silicate glass shell of substantially homogeneous composition and uniform geometry.

11 Claims, 1 Drawing Sheet

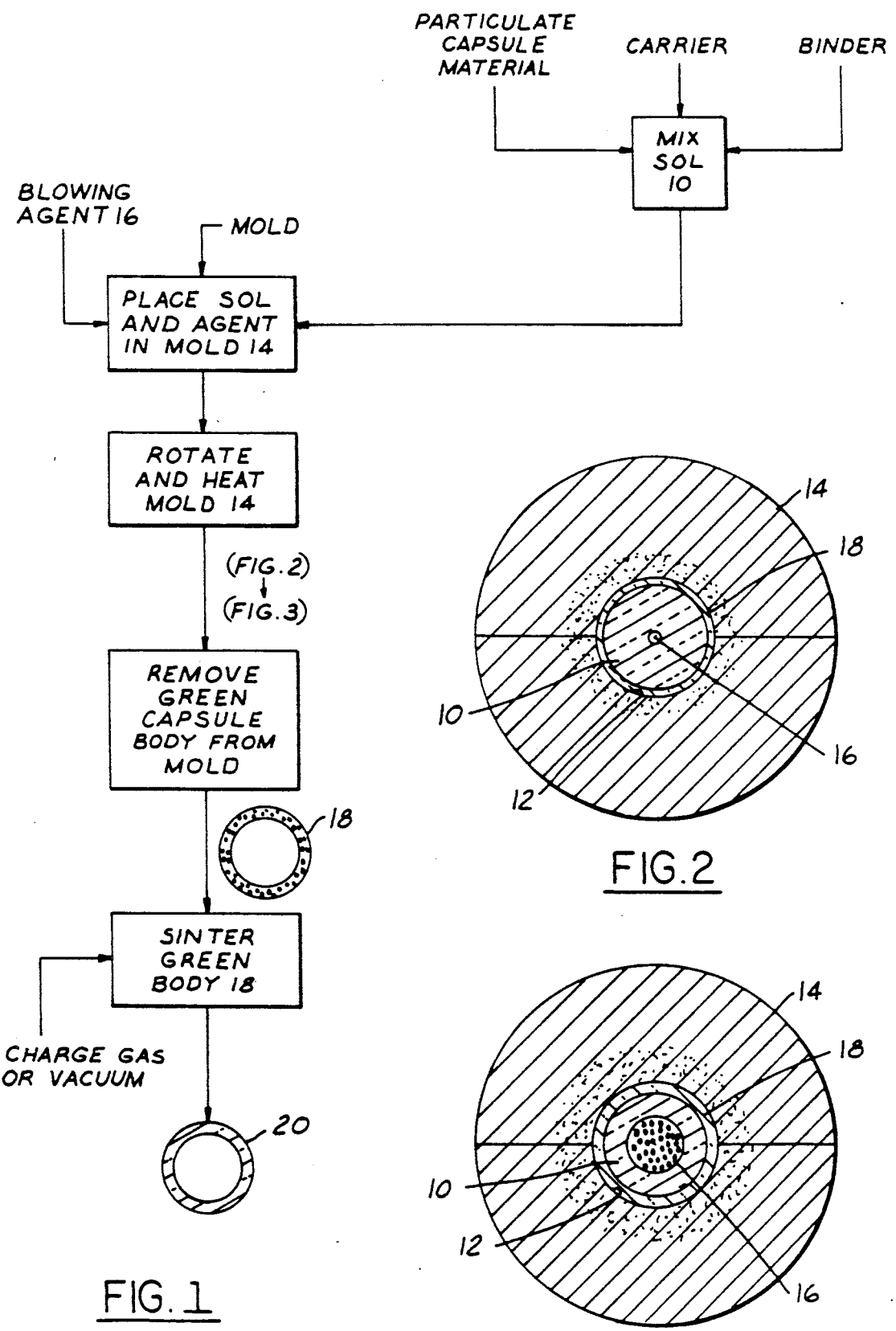

HOLLOW SPHERICAL SHELL MANUFACTURE

The Government has rights to this invention pursuant to Contract No. DE-AC03-87DP10560 awarded by the U.S. Department of Energy.

The present invention is directed to manufacture of hollow spherical shells of glass, ceramic, metal or plastic composition, and more particularly to a method of manufacturing such shells having an outer diameter on the order of one millimeter or larger.

BACKGROUND AND OBJECTS OF THE INVENTION

Use of hollow spherical shells as fuel containers in the inertial confinement fusion (ICF) field has demonstrated a number of advantages well recognized in the art. In the case of glass shells in particular, these advantages include transparency, high strength, high permeability to hydrogen-isotope fuel at moderate temperatures and low permeability at room temperature. These and other advantages are also demonstrated to a greater or lesser extent by shells of polymeric or ceramic composition. One essential requirement for any fuel-containing shell in ICF applications is wall uniformity—i.e., uniform spherical geometry, wall thickness and composition. These requirements have been met in manufacture of microspheres (diameter less than about 1 mm), particularly in the case of glass microspheres. See U.S. Pat. Nos. 4,017,290 and 4,021,253. However, the requirement of wall uniformity is not well met for larger fuel containers, such as glass macrospheres of diameter on the order of about 1 mm or larger blown by hand or machine.

It has heretofore been proposed to provide macro-sized shells of the described character in a multistep operation in which hemispherical cavities are machined into two glass disks, and the disks are then assembled into a cylindrical crucible. The crucible containing the glass is rotated and heated in a horizontal tube furnace to fuse the disks to each other, and to allow surface tension to spheridize the void formed by the two hemispherical cavities. Rotating the tube at proper angular velocity time-averages the gravity vector to zero, thus simulating a zero gravity condition. The affects of gravity must be canceled to eliminate buoyancy that would effectively deform the void. After cooling, excess glass is machined away. See 1988 KMSF Annual Technical Report, pages 40–43.

Although the process so described has been successfully employed in manufacture of millimeter-size shells, improvements remain desirable. In particular, the described process, involving multiple forming and machining operations, is expensive to implement, and requires attention of highly skilled technicians to form shells successfully of desired size and uniformity. The described process is not readily amenable to economical mass production of shells. Furthermore, evacuating the shells and/or filling the shells with desired fuel material involves additional steps beyond those employed for shell manufacture.

It is a general object of the present invention to provide a method of making hollow spherical shells of uniform geometry and composition that is particularly well suited for manufacture of millimeter-size shells and larger, that is less expensive to implement than processes heretofore employed for manufacture of millimeter-size shells, that may be employed for manufacture of shells of glass, ceramic, metal or plastic composition, that yields shells of desired size and uniformity with little or no post-forming machining operations, and in which the atmosphere of the shell interior may be selectively controlled during the manufacturing process and without requiring additional process steps to evacuate the shell interior and/or fill the shell interior with selected gases.

SUMMARY OF THE INVENTION

A process for making a hollow spherical shell of substantially uniform composition and geometry in accordance with the present invention is carried out by providing a mold having a hollow spherical internal cavity surrounded by a porous mold body. A colloidal suspension of particles of desired shell composition in a carrier liquid is placed within the mold cavity. The size of the particles is greater than pore size of the mold body at the cavity surface. The carrier liquid is then drawn out of the cavity by capillary flow into the mold body so as to deposit a green shell compact as a layer of particles around the surface of the cavity. The green shell compact is then removed from the mold cavity, and preferably is sintered at elevated temperature so as to form a shell of substantially homogeneous composition.

In the preferred implementations of the invention, capillary flow of the carrier liquid into the mold body is enhanced by placing a quantity of volatile liquid that is immiscible in the carrier liquid into the shell cavity with the colloidal suspension. The mold cavity is then heated so as to boil the volatile liquid such that vapor pressure of the boiled liquid acts as a blowing agent to assist migration of the carrier liquid into the mold body. Most preferably, the mold cavity is subjected to reduced effective gravity by rotating the mold during this operation so as to center the volatile liquid within the mold cavity and thereby promote uniform deposition of the suspended particles around the cavity surface. The colloidal suspension may also include an organic binder for enhancing green strength of the compact shell. The sintering operation may be performed in an atmosphere, either vacuum or gas atmosphere of selected composition, so that the sintering atmosphere permeates the shell during the sintering operation, and is captured within the shell as the shell particles fuse to each other.

In a preferred implementation of the present invention, the process so described is employed for making hollow spherical millimeter-size shells of silicate glass composition. The green shell compact prior to sintering thus consists essentially of a multiplicity of silicate glass particles that, when sintered at an elevated temperature, fuse to form a shell of substantially homogeneous silicate glass composition. Sintering may take place at a temperature in the range of 1300° to 1500° C. for 8 to 24 hours. Sintering at 1500° C. for eight hours is preferred, both for reasons of economy and because of improved shell porosity characteristics.

BRIEF DESCRIPTION OF THE DRAWING

The invention, together with additional objects, features and advantages thereof, will be best understood from the following description, the appended claims and the accompanying drawing in which:

FIG. 1 is a flow diagram that illustrates the process in accordance with a presently preferred embodiment of the invention; and FIGS. 2 and 3 are schematic diagrams that illustrate operation of the invention.

DETAILED DESCRIPTION OF PREFERRED EMBODIMENT

Referring to the drawing, a colloidal suspension or sol 10 is formed by mixing a particulate capsule material with a carrier liquid and an organic binder. The particulate capsule material may be of any suitable composition that is suspendible in a carrier and fusible through sintering. Glass is preferred. However, in this respect, the invention provides a method of making metallic shells, which have always presented a distinct problem in the art. The carrier liquid may be of any suitable type, including water. The capsule particles preferably are of sub-micron size.

Sol 10 is then placed within the centered spherical cavity 12 of a split porous mold 14. Mold 14 may be of any suitable composition, such as plaster of paris. Pore size of mold 14 at the surface of cavity 12 is less than particle size of sol 10. A drop 16 of a volatile liquid—i.e., having a lower boiling temperature than that of the carrier liquid—and which is immiscible in the carrier liquid, is placed in cavity 12 simultaneously with the sol. This may be accomplished by placing drop 16 into one section of an empty mold, and then assembling mold 14 while immersed in sol 10.

Mold 14 is then rotated within a horizontal tube furnace to cancel the effects of gravity and boil blowing agent 16. The carrier liquid migrates by capillary action into the body of mold 14 through the cavity surface. This carrier liquid migration is assisted by the pressure of the vaporized flowing agent. As the carrier liquid enters the body of mold 14, the suspended particles are deposited as a layer around the mold cavity surface. Spinning of the mold during this process centers blowing agent 16 within cavity 12 so that the outer surface of the expanding agent (FIG. 3) is concentric with the mold cavity and promotes uniformity of carrier migration and particle deposition.

The immiscible liquid or blowing agent establishes an inner surface that migrates radially outwardly as the carrier liquid is absorbed in the porous mold. A gas bubble could also be used to establish the inner surface, but pressure within the bubble would decrease as carrier liquid is removed from the mold cavity. This decreasing pressure within the mold cavity would impede removal of carrier liquid by capillary action into the porous mold. Use of a volatile immiscible liquid increases the pressure within the mold cavity by boiling the immiscible liquid, thereby assisting in the removal of carrier liquid by capillary action. Rotating the mold serves to pull the immiscible liquid on center. Maintaining rotation during removal of the carrier liquid maintains spherical symmetry, and assures uniform removal of carrier liquid. Since the solids concentration is uniform throughout the suspension, maintaining spherical symmetry during removal of the carrier liquid results in uniform deposition of the solids on the inside of the mold.

Following deposition of the particulate material around the mold cavity interior, the resulting green compact 18 is removed from the mold. Compact 18 is then sintered at suitable elevated temperature for a time sufficient to fuse the green compact particles into a shell 20 of homogeneous composition. As previously noted, the sintering operation may be performed under vacuum or in an atmosphere of a charge gas. Since shell compact 18 is highly porous but becomes non-porous as the particles fuse, the resulting shell 20 is either evacuated or filled with the charge gas.

In one implementation of the invention for manufacture of a densified vitreous silica capsule having an outside diameter of 6 mm and a wall thickness of 50 micrometers, cavity 12 of mold 14 has a diameter of 7.71 mm to allow for shrinkage of the green compact during the sintering operation. Sol 10 includes spherical particles of essentially pure silica composition suspended in water in quantities sufficient that the solid content of the sol is 5.1 w/o. The silica particles are of a size in the range of 0.01 to 0.05 micrometers in diameter and have a specific surface area in the range of 50 to 200 $m^2/gm$. The organic binder is PVA. A 1.3 mm diameter drop of hexane as blowing agent 16, when volatilized, provides one atmosphere of pressure after the bubble has expanded to the diameter of the mold cavity. The binder is removed by burn-out at 550° C. for one hour. Sintering of the resulting green compact 18 at a temperature of 1300° to 1500° C. for 8 to 24 hours yields a shell 20 of uniform composition, having wall thickness variations of about 1% and outside diameter variations of about 0.1%. These tolerances are superior to those heretofore obtained in the multistep machining process described above.

I claim:

1. A process for making a hollow spherical shell of substantially uniform composition and geometry comprising the steps of:
    (a) providing a mold having a hollow spherical cavity surrounded by a porous mold body,
    (b) placing within said mold cavity a colloidal suspension of particles of selected material composition in a carrier liquid, said particles being of size greater than pore size of said mold body,
    (c) placing a quantity of a volatile liquid that is immiscible in said carrier liquid in said cavity with said suspension,
    (d) drawing said carrier liquid out of said cavity by capillary flow of said liquid into said mold body, and thereby depositing a green shell compact of said particles around said cavity, while heating said mold cavity so as to boil said volatile liquid such that vapor pressure of said boiled liquid assists migration of said carrier liquid into said mold body, and
    (e) removing said green shell compact from said mold cavity.

2. The method set forth in claim 1 comprising the additional step of: (f) subjecting said mold cavity to reduced gravity during said step (d) so as to promote uniform deposition of said particles around said cavity.

3. The method set forth in claim 3 wherein said step (f) is carried out by spinning said cavity at uniform angular velocity so as to time-average the gravity vector substantially to zero and to center the volatile liquid within the mold cavity.

4. The method set forth in claim 1 wherein said step (b) includes the step of placing an organic binder in said cavity with said suspension to enhance green strength of said shell compact.

5. The method set forth in claim 4 comprising the additional step of: (f) subjecting said mold cavity to reduced gravity during said step (d) so as to promote uniform deposition of said particles around said cavity.

6. The method set forth in claim 5 wherein said step (f) is carried out by spinning said cavity at uniform angular velocity so as to time-average the gravity vector substantially to zero.

7. The method set forth in claim 1 comprising the additional step, following said step (e), of: (f) sintering said green shell compact to form a shell of substantially homogeneous composition.

8. The method set forth in claim 7 wherein said step (f) is carried out in an atmosphere of selected composition and pressure so as to capture a portion of said atmosphere within said shell following completion of said step (f).

9. The method set forth in claim 1 wherein said material composition is selected from the group consisting of glass, metal, ceramic and plastic compositions.

10. A method of making a hollow spherical shell of silicate glass composition comprising the steps of:
   (a) providing a mold having a hollow spherical cavity surrounded by a mold body having a predetermined maximum pore size at said cavity,
   (b) placing within said cavity an aqueous suspension of silicate glass particles and an immiscible liquid having a boiling point less than water,
   (c) spinning said cavity to reduce effective gravity substantially to zero while heating said cavity so as to vaporize said immiscible liquid and urge the water carrier of said aqueous suspension to migrate into said mold body, leaving a green shell compact deposited around said mold cavity.
   (d) removing said green shell compact from said cavity, and
   (e) sintering said green shell compact for a time and at a temperature sufficient to form a silicate glass shell of substantially homogenous composition and uniform geometry.

11. A process for making a hollow spherical shell of substantially uniform composition and geometry comprising the steps of:
   (a) providing a mold having a hollow spherical cavity surrounded by a porous mold body,
   (b) placing within said mold cavity a colloidal suspension of particles of selected material composition in a carrier liquid, said particles being of size greater than pore size of said mold body,
   (c) placing a quantity of a volatile liquid that is immiscible in said carrier liquid in said cavity with said suspension,
   (d) drawing said carrier liquid out of said cavity by capillary flow of said liquid into said mold body, and thereby depositing a green shell compact of said particles around said cavity, while heating said mold cavity so as to boil said volatile liquid such that vapor pressure of said boiled liquid assists migration of said carrier liquid into said mold body,
   (e) subjecting said mold cavity to reduced gravity during said step (d), so as to promote uniform deposition of said particles around said cavity, by spinning said cavity at uniform angular velocity so as to time-average the gravity vector substantially to zero, and
   (f) removing said green shell compact from said mold cavity.

* * * * *

UNITED STATES PATENT AND TRADEMARK OFFICE
CERTIFICATE OF CORRECTION

PATENT NO. : 5,068,071

DATED : November 26, 1991

INVENTOR(S) : Thomas P. O'Holleran

It is certified that error appears in the above-identified patent and that said Letters Patent is hereby corrected as shown below:

Column 4, line 54, change "claim 3" to -- claim 2 --.

Signed and Sealed this

Twentieth Day of April, 1993

Attest:

MICHAEL K. KIRK

*Attesting Officer*   Acting Commissioner of Patents and Trademarks